US011798536B2

(12) United States Patent
Asghar et al.

(10) Patent No.: US 11,798,536 B2
(45) Date of Patent: Oct. 24, 2023

(54) ANNOTATION OF MEDIA FILES WITH CONVENIENT PAUSE POINTS

(71) Applicant: INTERNATIONAL BUSINESS MACHINES CORPORATION, Armonk, NY (US)

(72) Inventors: Jonathan Asghar, Austin, TX (US); Belinda Marie Vennam, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 246 days.

(21) Appl. No.: 17/346,324

(22) Filed: Jun. 14, 2021

(65) Prior Publication Data

US 2022/0399010 A1 Dec. 15, 2022

(51) Int. Cl.
*G10L 15/22* (2006.01)
*G10L 15/18* (2013.01)
*G10L 15/26* (2006.01)
*G06F 16/60* (2019.01)
*G10L 15/08* (2006.01)
*G10L 15/30* (2013.01)
*G10L 25/63* (2013.01)

(52) U.S. Cl.
CPC .......... *G10L 15/1815* (2013.01); *G06F 16/60* (2019.01); *G10L 15/083* (2013.01); *G10L 15/26* (2013.01); *G10L 15/30* (2013.01); *G10L 25/63* (2013.01)

(58) Field of Classification Search
CPC ...... G10L 15/1815; G10L 15/30; G10L 15/26
See application file for complete search history.

(56) References Cited

U.S. PATENT DOCUMENTS

| 9,031,493 B2 | 5/2015 | Morton |
| 9,449,523 B2 | 9/2016 | Dougherty |
| 10,672,399 B2 | 6/2020 | Cannistraro |

(Continued)

FOREIGN PATENT DOCUMENTS

CN 102937959 A 2/2013

OTHER PUBLICATIONS

Disclosed Anonymously, "System and Method for Enhanced Narration of Audio Books," IPCOM000258069D, Apr. 4, 2019, 4 pages, https://ip.com/IPCOM/000258069.

(Continued)

*Primary Examiner* — Ibrahim Siddo
(74) *Attorney, Agent, or Firm* — David Spalding

(57) ABSTRACT

A computer-implemented method, a computer system and a computer program product annotate media files with convenient pause points. The method includes acquiring a text file version of an audio narration file. The text file version includes a pause point history of a plurality of prior users. The method also includes generating a list of pause points based on the pause point history. In addition, the method includes determining a tone of voice being used by a speaker at each pause point using natural language processing algorithms. The method further includes determining a set of convenient pause points based on the list of pause points and the determined tone of voice. Lastly, the method includes inserting the determined set of convenient pause points into the audio narration file.

20 Claims, 5 Drawing Sheets

(56) References Cited

U.S. PATENT DOCUMENTS

| | | |
|---|---|---|
| 2011/0231474 A1 | 9/2011 | Howard |
| 2012/0105460 A1* | 5/2012 | Kim .................. G09B 5/062 |
| | | 345/501 |
| 2015/0169279 A1* | 6/2015 | Duga ............... G06F 15/0291 |
| | | 700/94 |
| 2019/0204998 A1 | 7/2019 | Hartrell |

OTHER PUBLICATIONS

Mell et al., "The NIST Definition of Cloud Computing", National Institute of Standards and Technology, Special Publication 800-145, Sep. 2011, 7 pages.

\* cited by examiner

ANNOTATION OF MEDIA FILES WITH CONVENIENT PAUSE POINTS

BACKGROUND

Embodiments relate generally to annotating media files with metadata, and more specifically to indicating convenient pause points in a media file based on historical data and natural language processing.

In the digital age, electronic devices capable of playing digital media have become commonplace and even essential to consumers. These devices, which include laptop computers, handheld digital media players, smart phones, and handheld gaming systems, appeal to a wide demographic and are used daily. As a result of a migration away from physical media and into digital media, creative works that once were published in printed form only are increasingly available in digital form. Digital books, or "e-books", are increasingly popular, a development that has given rise to a new specialized class of handheld electronic devices known as e-book readers, or "e-readers". In turn, handheld devices such as tablet computers and smart phones, although not designed solely as e-readers, may have the capability to be operated as e-readers through software applications.

For many of these creative works, usually those that become popular, an audio version of the written work may be created and made available for purchase, either online or in a physical store. This audio version may consist of, for example, a recording of a famous individual (or one with a pleasant voice) reading a written work. It is not uncommon for consumers to purchase both the e-book and the audio version of the work, or "audiobook". One reason may be that a reader completes the e-book and then desires to listen to the audiobook. In other example, a reader may transition between reading the e-book and listening to the audiobook, based on the user's circumstances. For example, while engaging in sports or driving during a commute, the reader may listen to the audiobook but when lounging in a sofa-chair prior to bed, the user may prefer to read the e-book. However, whether a reader may purchase an e-book or an audiobook or both, it is also common for the underlying media files to remain on a publicly available server and for a reader to interact with their content through the use of a subscription service that may have an account connected to it and has the ability to discern the habits and preferences of a reader to optimize their interaction with their media content.

SUMMARY

An embodiment is directed to a computer-implemented method for annotating media files with convenient pause points. The method may include acquiring a text file version of an audio narration file. The text file version may include a pause point history of a plurality of prior users. The method may also include generating a list of pause points based on the pause point history. In addition, the method may include determining a tone of voice being used by a speaker at each pause point using natural language processing algorithms. The method may further include determining a set of convenient pause points based on the list of pause points and the determined tone of voice. Lastly, the method may include inserting the determined set of convenient pause points into the audio narration file.

In another embodiment, generating the list of pause points may further include mapping each pause point in the list to a corresponding location in the audio narration file.

In a further embodiment, a machine learning classification model that predicts the tone of voice in spoken audio may be used to determine the tone of voice being used by a speaker.

In another embodiment, determining the set of convenient pause points may include determining a first frequency that each pause point occurs in the list. Determining the set of convenient pause points may also include adding the pause point to a first group of pause points in response to the first frequency being above a first threshold. Determining the set of convenient pause points may further include determining a second frequency that the tone of voice is used at locations in the audio narration file. In addition, determining the set of convenient pause points may include adding the locations where the tone of voice is used to a second group of pause points in response to the second frequency being above a second threshold. Lastly, determining the set of convenient pause points may include generating the set of convenient pause points based on the first and second groups of pause points.

In yet another embodiment, inserting the determined set of convenient pause points into the audio narration file may include inserting the determined set of convenient pause points into the text file version of the audio narration file.

In an alternative embodiment, inserting the determined set of convenient pause points into the audio narration file may include updating the pause point history.

In another embodiment, the method may include transmitting the set of convenient pause points to a user. The method may also include monitoring an interaction of the user with the set of convenient pause points. Lastly, the method may include updating the pause point history based on the interactions.

In addition to a computer-implemented method, additional embodiments are directed to a system and a computer program product for annotating media files with convenient pause points.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
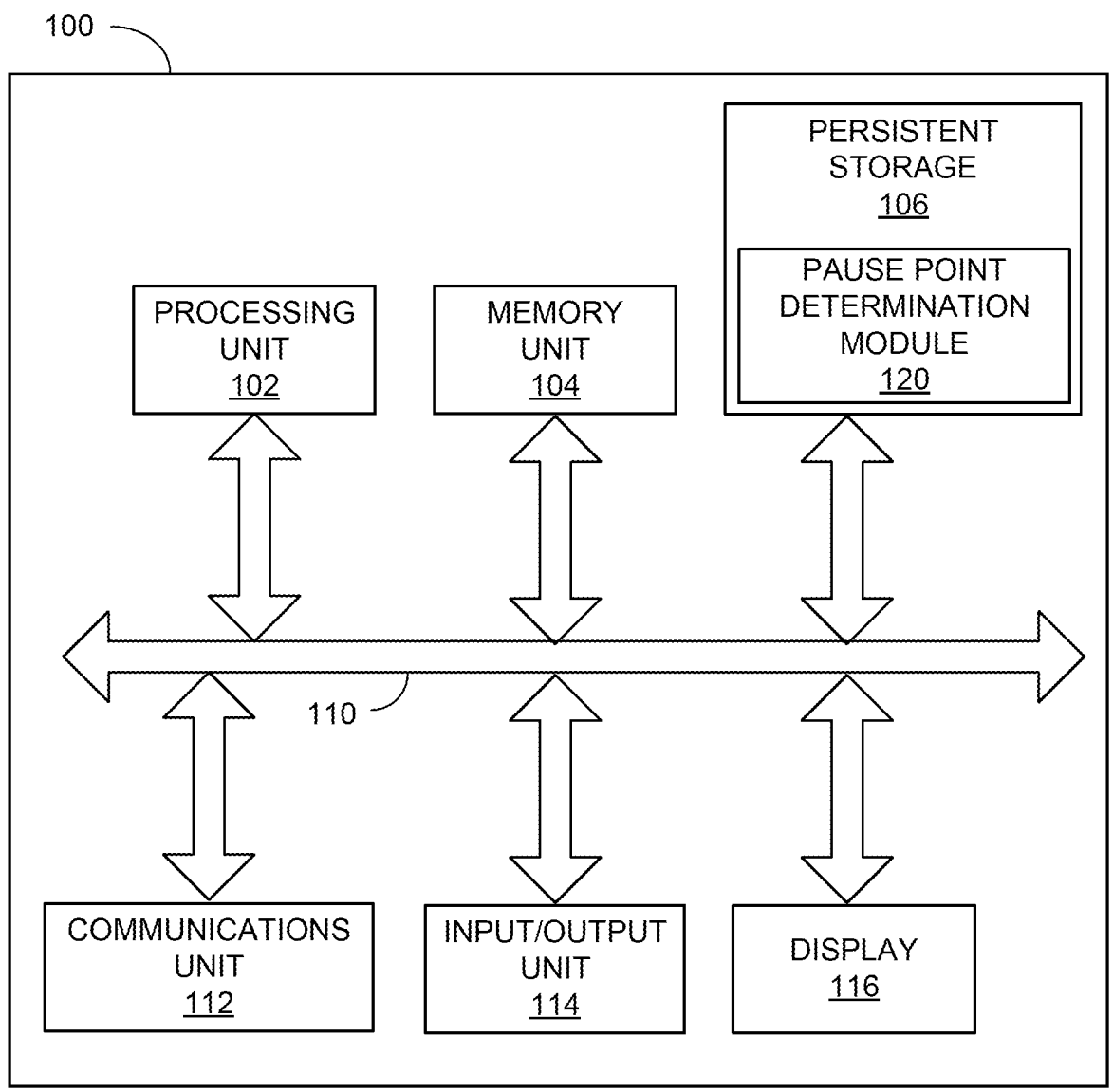
FIG. 1 depicts a block diagram of an example computer system embedded in a server or mobile device in which various embodiments may be implemented.

When listening to audiobooks, it may be easy for a reader to stop paying attention while listening, and ultimately lose the context of the story. For instance, the reader may have started the recording close to bedtime and drifted off to sleep. To anticipate this, many applications that play audiobooks may enable a reader to set a timer for a specific amount of time, such as 3, 8, 15, or 45 minutes, before the recording automatically stops. These timers allow the recording to be stopped such that if the reader loses attention, they are less likely to lose their place in the book because the recording would not play further. However, a downside of a timer such as this feature may be that the pause point would be based on time and therefore the recording may stop at a non-optimal point, such as the middle of a major plot revelation, in the midst of an ongoing action sequence, or simply not a good "pause point" in the context of the story being told.

This may contrast with the typical situation when reading the text version of a book. In that scenario, a reader may stop at a specific place on a page that might indicate a good pause point, e.g., the end of a paragraph or at the end of a particular "scene" or "storyline" in the book. Because a reader may have the ability see what is next on the page, or in the case of an e-book, what is next on the screen, a reader may be able to quickly scan ahead to determine if a new scene with new characters is coming or if the context has changed, and then use that knowledge to decide whether a certain pause point is appropriate. What is needed is a way of intelligently determining appropriate pause points in audiobooks that does not rely solely on established, but perhaps not optimal, attributes such as chapter endpoints, specific timers, or paragraph endings.

If an e-book is available publicly in addition to the audio version currently being consumed, the collective decisions of prior and current readers, including perhaps the current user if they already finished the e-book, as to appropriate pause points may be logged and stored to assist a reader, who may be listening to an audiobook for the first time, in determining convenient pause points in their content.

Such "candidate" pause points may be determined from at least two pieces of data that may be available. The first piece of data may be the interactions of prior or current readers with the e-book or audiobook. These interactions may be collected and noted, e.g., every time a reader has stopped while consuming either version of the book, the pause point may be added to the list of candidates. This list may consist of hundreds or even thousands of pause points, all of which may or may not be appropriate. Therefore, the list of candidates may be analyzed to determine which pause points are the most common, or where in the story or narrative a majority of readers stop. For instance, if a computer crashed or network connection was lost, there may be a pause point that makes no sense and therefore should be ignored. Because it is highly unlikely that several readers would have the exact same issue at the exact same place in the story, filtering the list for commonality among readers may help filter out any anomalies such as the example described above. However, it should be noted that it is not required that any filtering of the list take place, only that the aggregate list of candidates be determined for the book in question.

The second piece of data that may be utilized to assist with the determination of appropriate pause points is the tone or inflection of the voice of the narrator at each pause point on the list of candidates. The recorded audio in the audiobook may be analyzed using natural language processing (NLP) algorithms and, as an example, if most textual pause points correlate with a downward inflection, angry tone, or neutral tone, then a model can be trained to look for those specific tones or inflections. The text file may also be searched to look for locations where these tones or inflections are used within the audio narration and create a group of pause points based on this search. The list of candidates generated above, corresponding to where the majority of readers pause in the text version, combined with the group of pause points based on the most commonly used tones or inflections may form a new set of convenient pause points in the content. The new set of convenient pause points may then be inserted into either or both of the audio narration file and acquired text file using an appropriate method.

Referring to FIG. 1, a block diagram is depicted illustrating a computer system 100 which may be embedded in a client device 220, which may be a computer or tablet or e-reader or any other device that may be used to listen to an audiobook in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 includes a processor unit 102, a memory unit 104, a persistent storage 106, a communications unit 112, an input/output unit 114, a display 116, and a system bus 110. Computer programs such as the pause point identification module 120 are typically stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 also includes a communications unit 112 such as TCP/IP adapter cards, wireless Wi-Fi interface cards, or 3G or 4G wireless interface cards or other wired or wireless communication links. The document identification module 120 and the virtual meeting application 206 in the server may communicate with external computers via a network (for example, the Internet, a local area network or other wide area network) and respective network adapters or interfaces. From the network adapters or interfaces, the document identification module 120 and the virtual meeting application 206 in the server may be loaded into the respective persistent storage 106.

Figure 2:
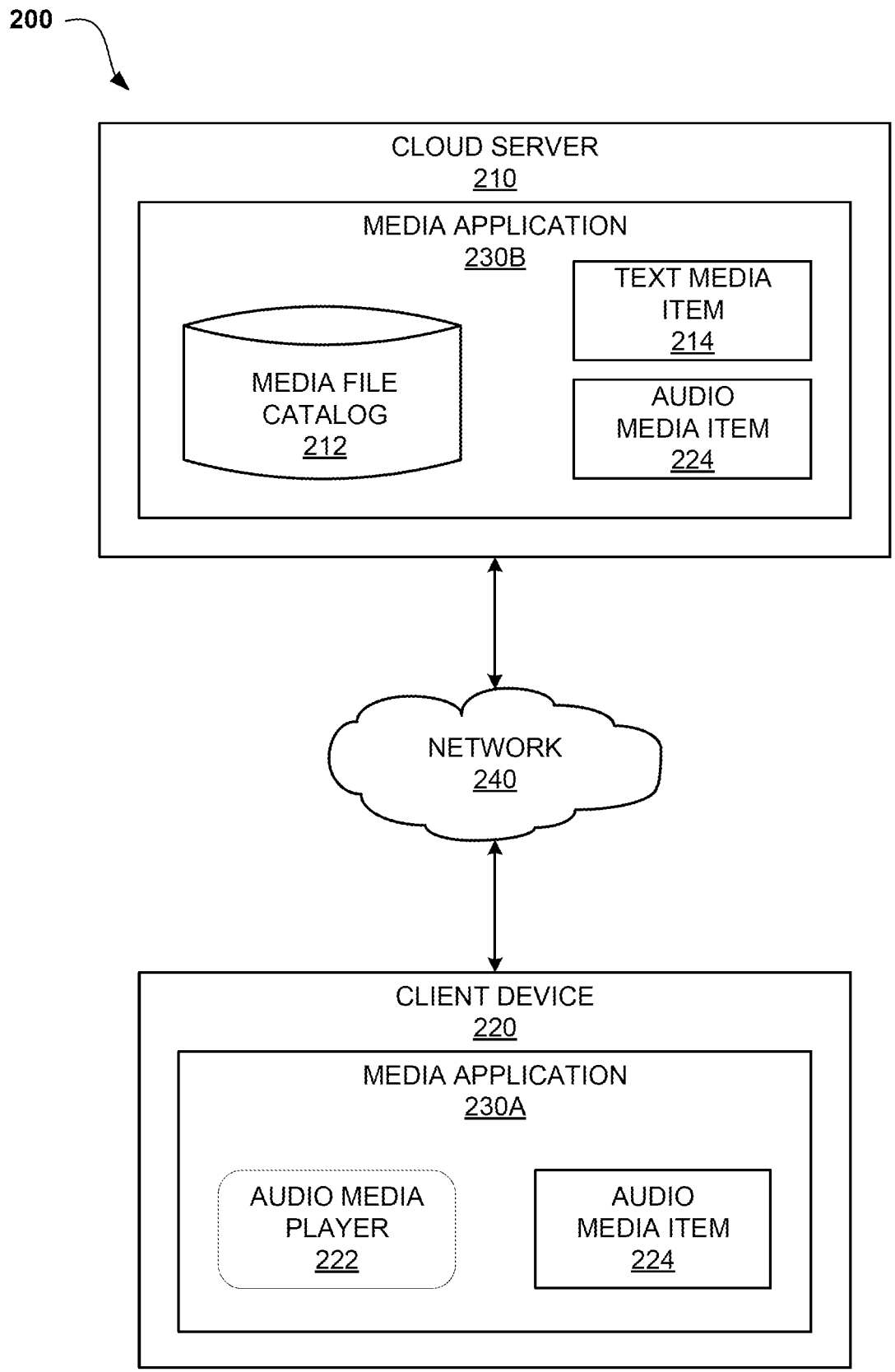
FIG. 2 depicts a block diagram of a computing system that may be used to download and listen to an audiobook, according to an exemplary embodiment.

Referring to FIG. 2, a block diagram of an example networked computing environment 200 that may be used to implement some of the processes described herein is depicted, according to an embodiment. In this example, network environment 200 may indicate a service that implements media application 230A, 230B on cloud server 210 and client device 220, which may both include computer system 100, and provides media files, including audiobooks and e-books, to users. Non-limiting examples of client devices 220 include desktop computers, laptop computers, smart phones, tablet computers, and other handheld computing devices.

Media application 230A, 230B represents a service that may coordinate item selection, download and playback between cloud server 210 and client device 220. Media application 230A, 230B is depicted in FIG. 2 as discrete blocks within the cloud server 210 and client device 220. However, in some embodiments, the media application 230A, 230B may operate fully within the cloud server 210, fully within the client device 220 or partially on each end of the link. Also, in some embodiments, there may not be a media application 230A, 230B in the configuration as it is only necessary for there to be an open audiobook. The cloud may be searched independently, and the subject audiobook analyzed for tone of voice or inflection without any media application 230A, 230B coordination.

Although only one client device is depicted, a user may own and operate more or less devices that consume digital media items, such as e-books and audio books. Similarly, although only a single cloud server 210 is depicted, the entity that owns and operates cloud server 210 may operate multiple devices, each of which may provide the same service or may operate together to provide media application 230B to the user of client device 220.

As depicted in FIG. 2, client device 220 may store an audio media item 224 and execute an audio media player 222 as part of media application 230A. Client device 220 may execute one or more other media players (not shown) that are configured to process other types of media, such as video or text. Similarly, audio media player 222 may be configured to process audio data and cause client device 220 to generate audio (e.g., via speakers on client device 220, not shown). Thus, in the case of audio media item 224, e.g., an audio book, audio media player 222 may be configured to process audio media item 224, as long as audio media item 224 is in an audio format that audio media player 222 is configured to process. It should be noted that while a single audio media item 224 is shown, audio media item 224 may also comprise multiple files if necessary.

In the example of FIG. 2, the audio media player 222 may also be configured to communicate with the cloud server 210 via the communication network 240 and coordinated by media application 230A. An audio media item 224, or audiobook, may be downloaded from the media file catalog 212 and stored in the client device 220, where it may be played by audio media player 222. The audio media player 222 may provide a user interface in which a user may listen to the audiobook. However, one of ordinary skill in the art will recognize that it is not necessary for the audio media item 224 to be downloaded to the client device. The audio media player 222 may play the audiobook from the cloud server 210 by streaming over the network 240.

The pause point determination module 120, shown in FIG. 1 as part of computing system 100, may operate in tandem with the audio media player 222 on the client device 220 in the configuration shown in FIG. 2. The module may be discrete software that is separately loaded into the computing device or may be embedded within the audio media player 222 at the computing device. It will be appreciated by one of ordinary skill in the art that while the pause point determination module 120 operates at a computing device, it is not required that the software is physically loaded or installed on the hardware but may be on a server for the listening session. The same is true for the audio media player 222 itself as the listening session may be fully in the cloud and hosted by the cloud server 210.

Cloud server 210 may store digital media items in various formats, such as text media item 214 or audio media item 224 that users may access via their respective client devices 220. As mentioned above, instead of storing a local copy of a digital media item, a device (e.g., client device 220) may request the digital media item from cloud server 210. These digital media items may be stored in the media file catalog 212, which may include a searchable database that indexes the available digital media items. Also, the text media item 214 and audio media item 224 may contain the same content in different formats, e.g., a text version and audio version of the same book. As mentioned above, these activities may be coordinated by media application 230B as part of a service to the user and associated client devices.

Additionally, cloud server 210 may store account data that associates one or more devices of a user with a single account, which may be part of a service profile and may be managed by media application 230B. Such account data may indicate that multiple client devices 220 are registered by the same user under the same account. Cloud server 210 may also store account-item association data that associates an account with one or more digital media items owned (or purchased) by a particular user. Cloud server 210 may verify that client device 220 may access a particular digital media item by determining whether the account-item association data indicates that client device 220 and the particular digital media item are associated with the same account.

The cloud server 210 may communicate with the client device 220 via the communication network 240, in accordance with embodiments of the invention. As will be discussed with reference to FIGS. 4 and 5, networked computing environment 200 may also operate in a cloud computing service model, such as Software as a Service (SaaS), Platform as a Service (PaaS), or Infrastructure as a Service (IaaS). The cloud server 210 that is shown, along with any other servers comprising the networked computing environment 200, may also be located in a cloud computing deployment model, such as a private cloud, community cloud, public cloud, or hybrid cloud.

The communication network 240 may include various types of communication networks, such as a wide area network (WAN), local area network (LAN), a telecommunication network, a wireless network, a public switched network and/or a satellite network. The communication network 240 may include connections, such as wire, wireless communication links, or fiber optic cables. The network 240 may also include additional hardware not shown such as routers, firewalls, switches, gateway computers and/or edge servers. It may be appreciated that FIG. 2 provides only an illustration of one implementation and does not imply any limitations with regard to the environments in which different embodiments may be implemented. Many modifications to the depicted environments may be made based on design and implementation requirements. Accordingly, the communication network 240 may represent any communication pathway between the various components of the networked computer environment 200.

Figure 3:
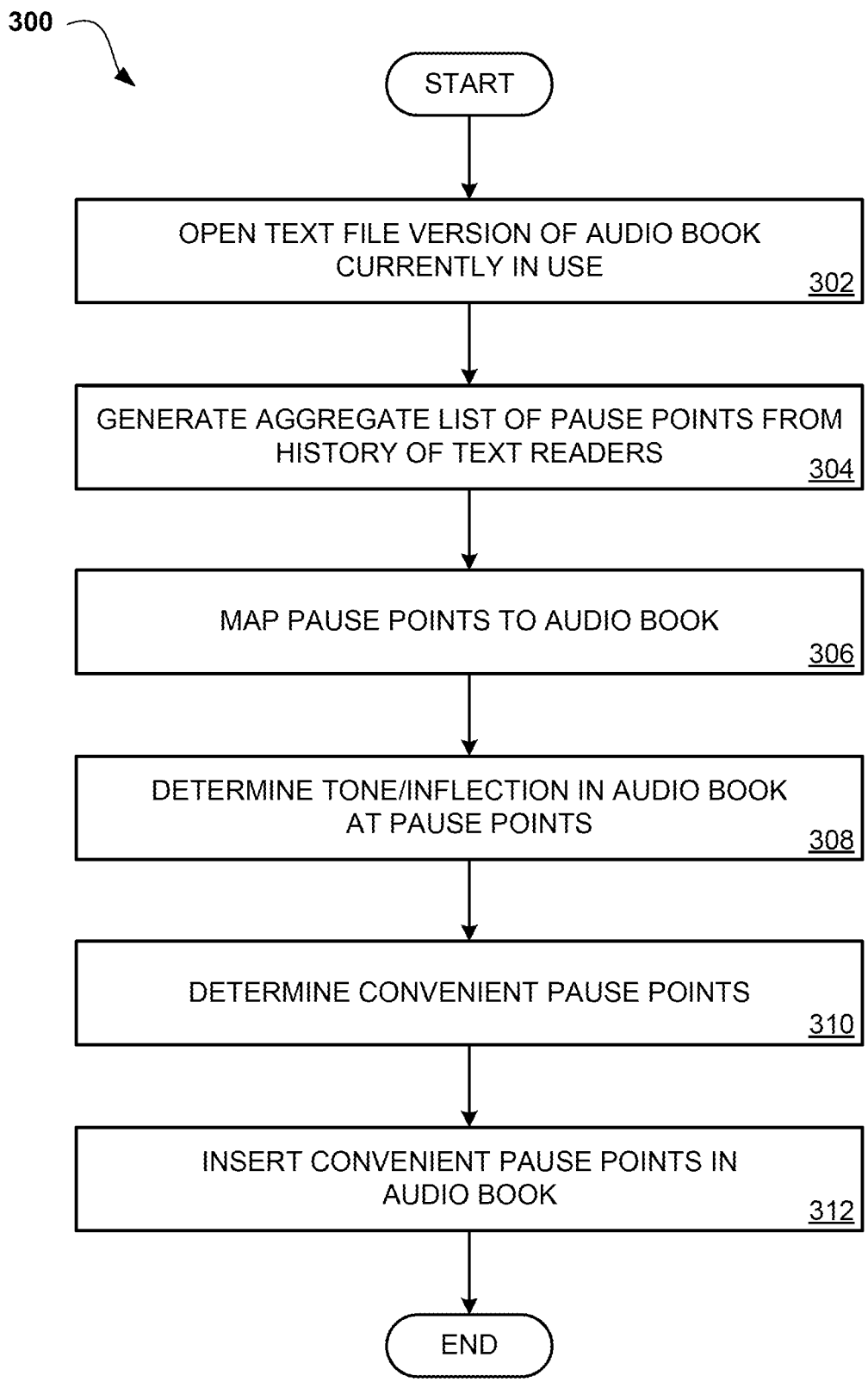
FIG. 3 depicts a flow chart diagram of a process to annotate media files with convenient pause points in accordance with one or more embodiments.

Referring to FIG. 3, an operational flowchart illustrating a process 300 for annotating media files with convenient pause points is depicted according to at least one embodiment. At 302, an e-book, or text file, corresponding to an audiobook, or audio file, currently in use may be acquired. Once an audiobook has been selected by a user for listening to the audio narration, various storage options that are accessible to the user's device may be searched using appropriate search terms. The storage options may include local drive storage, if the user has previously downloaded the e-book in addition to the audio narration file, or a cloud server accessible to the user's device, e.g., the user subscribes to a service that may provide in its catalog either or both of the e-book and the audiobook. The search terms may include the title of the selected audiobook or phrases within the text, as determined from the spoken audio, that may be distinctive. One of ordinary skill in the art would recognize that there are many ways to extract search terms that may be used to identify and acquire a text version of an audiobook. It is only necessary that the content of the e-book and the audiobook match.

At 304, pause points may be aggregated into a list of pause points from a history of prior readers of the e-book. Online services, e.g., a current service that may be in use for reading the audiobook, that may include the e-book in its catalog or any server that may contain the e-book may also include a reading history of that e-book, i.e., a prior history of the locations in the text that readers have paused. It is not required that the exact server or servers within a service where the e-book is retrieved be searched for a reader history. Any available history of readership for the e-book that matches the audiobook may be searched for pause points, or locations where past readers have paused while reading.

At 306, once an aggregate list of pause points is gathered from available sources, these pause points may be mapped to their corresponding locations in the audiobook. This may be accomplished by converting the audiobook from speech to text using automatic speech recognition (ASR), or speech-to-text (STT), algorithms and then comparing the resulting text data to the e-book. The list of pause points may then be matched to the converted text and the resulting set of locations noted in the narrated audio. One of ordinary skill in the art will recognize that there are multiple ways to map locations in a text file to the corresponding locations in the audio version. The locations may be annotated in an appropriate way within the user interface of the audio media player 222 and also marked in the audio media item 224, e.g., the audiobook that is currently in use. The audio at these annotated locations may be extracted and analyzed in the next step.

At 308, the audio at each of the annotated locations from 306 may be analyzed using natural language processing (NLP) algorithms to determine a tone of voice or inflection in use at the pause points in the audiobook. The tone of voice may be useful in determining whether a pause point is convenient. For example, a downward inflection, or trailing off, of the voice may indicate that the speaker is approaching a natural end point such as the end of a sentence or the end of a scene or chapter. These natural end points may be ideal to use as a pause point in the audiobook and are an additional data point for determining convenient pause points that are not available in the text version of the content. Therefore, pause points that are gathered from the text version of the content that correspond with specific tones or inflections of the voice may be preferred in the list as convenient pause points for the audiobook. At the same time, those pause points that correspond to other tones or inflections of the voice that indicate a more awkward or unknown emotion may be filtered out from the list of pause points as not suitable or convenient.

In an embodiment, a supervised machine learning classification model may be trained to predict the tone or inflection of the voice in spoken audio. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include several audio samples from a variety of users expressing various inflections and tones of voice. The training data may be collected from a single user or a group of users, with user consent required prior to collection. The classification results may be stored in a database so that the data is most current, and the output would always be up to date.

The list of pause points may be tagged based on the tone or inflection used at the corresponding location in the audio. For instance, if the list of pause points is stored in a database, an additional column may be added that includes the data about the tone or inflection used. The specific tones or inflections that form the categories may be configured prior to the analysis through manual programming of a set of categories or through the training data which may be used for the machine learning classification model in the example above.

At 310, a set of convenient pause points may be determined. One example of this determination is which pause points may be the most common in the e-book and also which tone or inflection may be the most common at the acquired pause points. In this example, a frequency may be determined for each pause point in the aggregate list of pause points that are acquired from the e-book. For instance, many users may pause at a certain location in the e-book because it is the end of a scene or chapter. If such a pause point is located, it may have a high frequency count. However, if a single user stopped at an awkward location because their device lost power, or the connection with the web server if it was streaming the content, then this pause point may have a low frequency count. A threshold may be established for the pause point frequency and those pause points with a frequency above the threshold may be grouped together.

Similarly, the analysis in 308 of the aggregate list of pause points may yield a variety of tones or inflections in use and this data can be assigned a frequency count. For instance, a downward inflection that indicates the end of a sentence may have a high frequency count while an excited tone may indicate the middle of a scene or sentence. In the same way as the first group, a threshold may be configured for the tone or inflection frequency and those pause points with a frequency above the threshold may also be grouped together separately.

The two groups of pause points may be overlaid on each other to look for a set of pause points that are the most commonly used and also most commonly use a certain tone or inflection. It should be noted that while the tone or inflection may be configured prior to this step to be a "best" or most desirable tone or inflection for a pause point, it is not necessary for there to be a specific tone or inflection used in the grouping of pause points or the determination of convenient pause points. The overlay of the groups, coupled with applying the results to the aggregate list of pause points, may yield a set pause points that may be the convenient pause points that may be recommended to the listener of the audiobook.

At 312, the set of convenient pause points may be inserted into the audiobook in the same way as in 306. That is, the text data may be analyzed and corresponding locations in the audiobook may be found in the same way that the prior list of pause points within the e-book were mapped to the audiobook. At this point, however, a listener to the audio may see within the user interface of the audio media player 222 or another software application in use the annotation of the media file that corresponds to the set of convenient pause points. It should be noted that a listener may choose at this point to accept the pause points or not and their decision may be noted and used to fine-tune, or update, the decision as to whether a pause point may be considered to be convenient. The online history for the content, including either or both of the e-book and audiobook files, may also be updated to reflect the listener's choices at this step.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
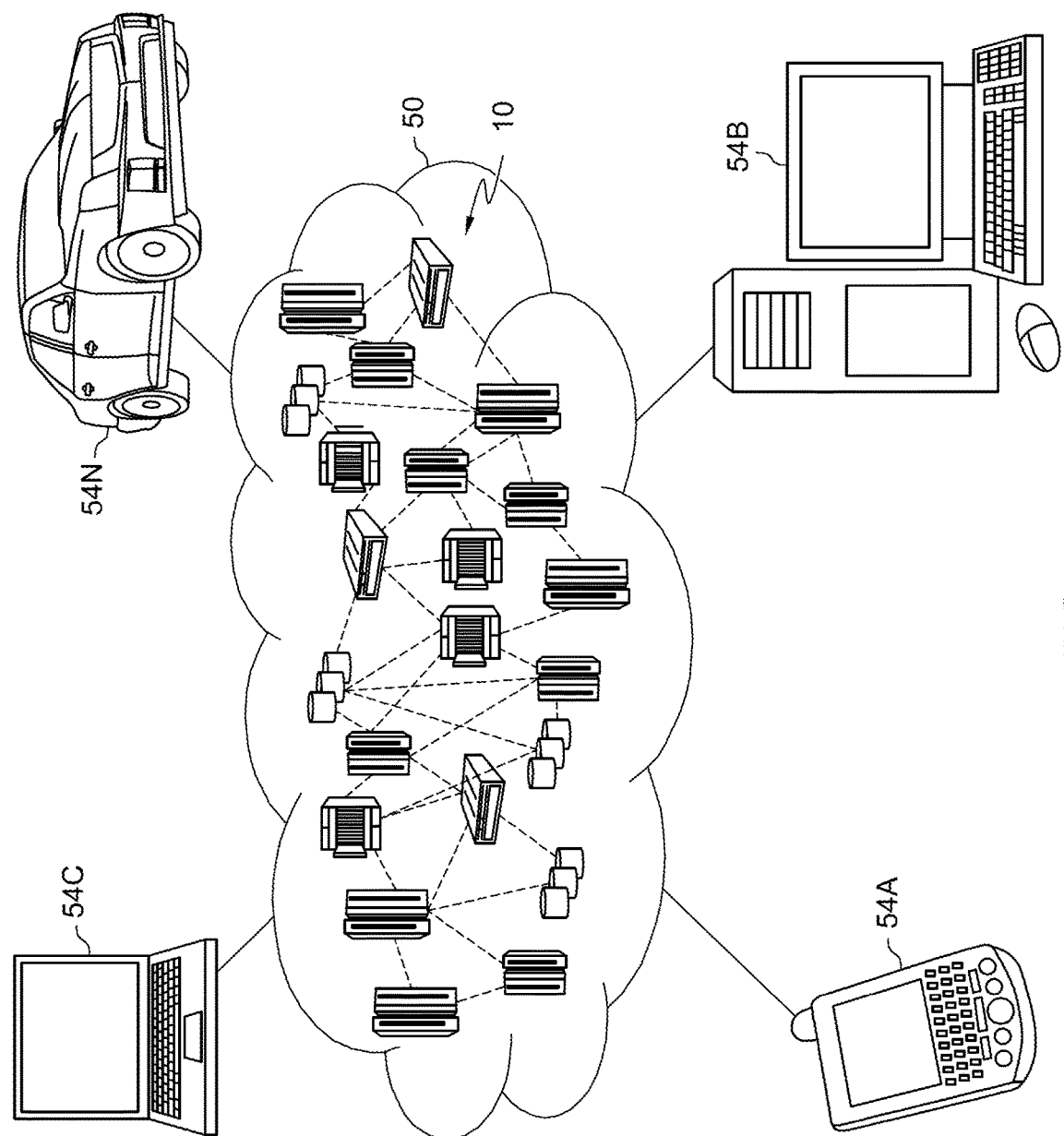
FIG. 4 depicts a cloud computing environment according to an exemplary embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 5:
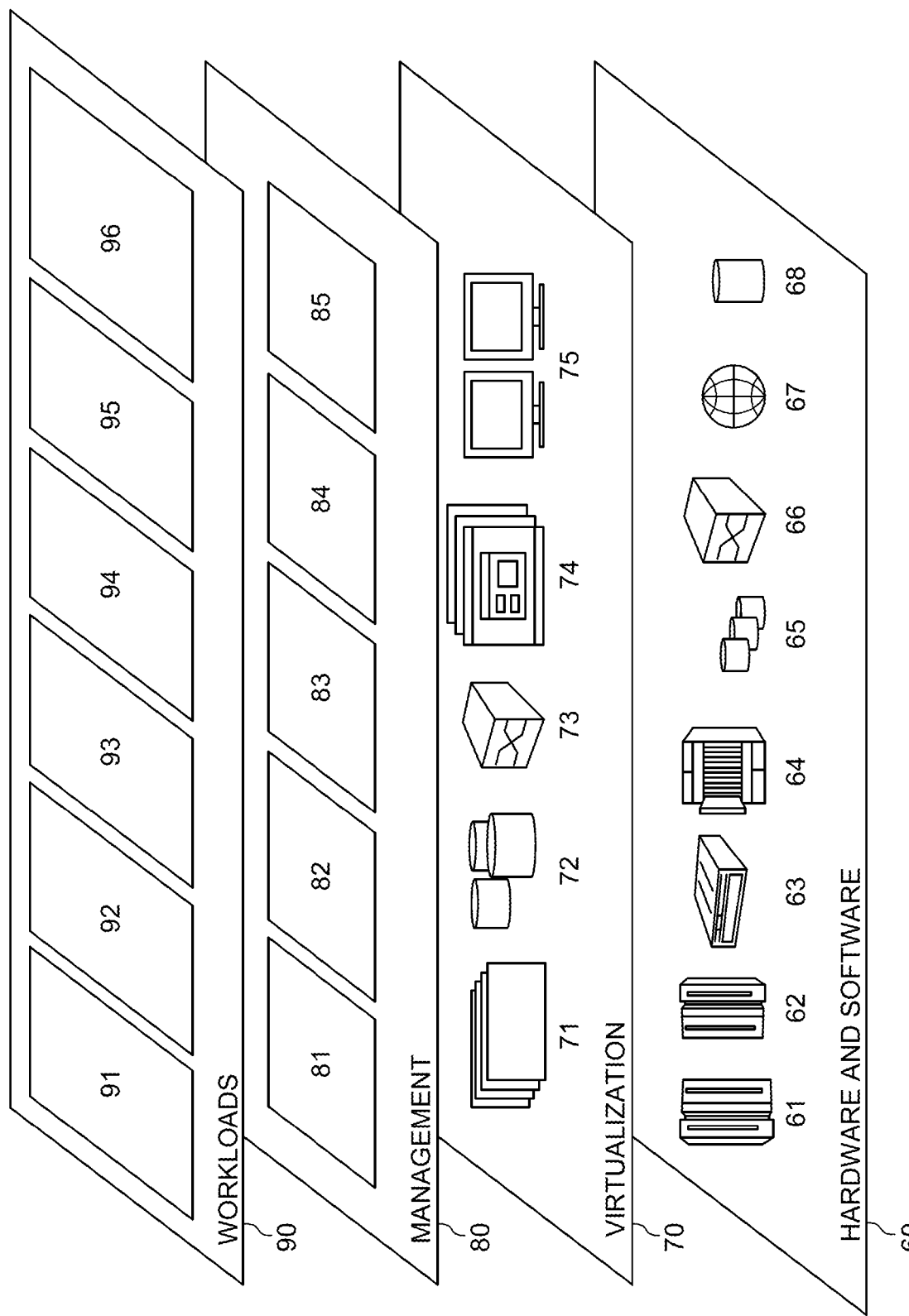
FIG. 5 depicts abstraction model layers according to an exemplary embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and pause point determination 96. Pause point determination 96 may relate to determining a set of convenient pause points and annotating media files accordingly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for annotating media files with convenient pause points, the computer-implemented method comprising:
    acquiring a text file version of an audio narration file, the text file version including a pause point history of a plurality of prior users;
    generating a list of pause points based on the pause point history;
    determining a tone of voice being used by a speaker in the audio narration file at each pause point using natural language processing algorithms;
    determining a set of convenient pause points based on the list of pause points and a determined tone of voice; and
    inserting the determined set of convenient pause points into the audio narration file.

2. The computer-implemented method of claim 1, wherein the generating the list of pause points further comprises mapping each pause point in the list to a corresponding location in the audio narration file.

3. The computer-implemented method of claim 1, wherein the natural language algorithms include a machine learning classification model that predicts voice tone in spoken audio.

4. The computer-implemented method of claim 1, wherein the determining the set of convenient pause points further comprises:
    determining a first frequency that each pause point occurs in the list;
    in response to the first frequency being above a first threshold, adding a pause point to a first group of pause points;
    determining a second frequency of the determined tone of voice in the audio narration file;
    in response to the second frequency being above a second threshold, adding a location associated with the determined tone of voice to a second group of pause points; and
    generating the set of convenient pause points based on the first group of pause points and the second group of pause points.

5. The computer-implemented method of claim 1, wherein the inserting the determined set of convenient pause points into the audio narration file further comprises inserting the determined set of convenient pause points into the text file version of the audio narration file.

6. The computer-implemented method of claim 1, wherein the inserting the determined set of convenient pause points into the audio narration file further comprises updating the pause point history.

7. The computer-implemented method of claim 1, further comprising:
    transmitting the set of convenient pause points to a user;
    monitoring an interaction of the user with the set of convenient pause points; and
    updating the pause point history based on the interactions.

8. A computer system for annotating media files with convenient pause points, the computer system comprising:
    one or more processors, one or more computer-readable memories, one or more computer-readable storage media, and program instructions stored on at least one of the one or more computer-readable storage media for execution by at least one of the one or more processors via at least one of the one or more memories, wherein the computer system is capable of performing a method comprising:
        acquiring a text file version of an audio narration file, the text file version including a pause point history of a plurality of prior users;
        generating a list of pause points based on the pause point history;
        determining a tone of voice being used by a speaker in the audio narration file at each pause point using natural language processing algorithms;
        determining a set of convenient pause points based on the list of pause points and the determined tone of voice; and
        inserting the determined set of convenient pause points into the audio narration file.

9. The computer system of claim 8, wherein the generating the list of pause points further comprises mapping each pause point in the list to a corresponding location in the audio narration file.

10. The computer system of claim 8, wherein the natural language algorithms include a machine learning classification model that predicts voice tone in spoken audio.

11. The computer system of claim 8, wherein the determining the set of convenient pause points further comprises:
- determining a first frequency that each pause point occurs in the list;
- in response to the first frequency being above a first threshold, adding a pause point to a first group of pause points;
- determining a second frequency of the determined tone of voice in the audio narration file;
- in response to the second frequency being above a second threshold, adding a location associated with the determined tone of voice to a second group of pause points; and
- generating the set of convenient pause points based on the first group of pause points and the second group of pause points.

12. The computer system of claim 8, wherein the inserting the determined set of convenient pause points into the audio narration file further comprises inserting the determined set of convenient pause points into the text file version of the audio narration file.

13. The computer system of claim 8, wherein the inserting the determined set of convenient pause points into the audio narration file further comprises updating the pause point history.

14. The computer system of claim 8, further comprising:
- transmitting the set of convenient pause points to a user;
- monitoring an interaction of the user with the set of convenient pause points; and
- updating the pause point history based on the interactions.

15. A computer program product for annotating media files with convenient pause points, the computer program product comprising:
- a computer-readable storage medium storing computer-readable program code instructions embodied therewith, the computer-readable program code comprising program code executable by a processor to cause the processor to perform a method comprising:
  - acquiring a text file version of an audio narration file, the text file version including a pause point history of a plurality of prior users;
  - generating a list of pause points based on the pause point history;
  - determining a tone of voice being used by a speaker in the audio narration file at each pause point using natural language processing algorithms;
  - determining a set of convenient pause points based on the list of pause points and the determined tone of voice; and
  - inserting the determined set of convenient pause points into the audio narration file.

16. The computer program product of claim 15, wherein the generating the list of pause points further comprises mapping each pause point in the list to a corresponding location in the audio narration file.

17. The computer program product of claim 15, wherein the natural language algorithms include a machine learning classification model that predicts voice tone in spoken audio.

18. The computer program product of claim 15, wherein the determining the set of convenient pause points further comprises:
- determining a first frequency that each pause point occurs in the list;
- in response to the first frequency being above a first threshold, adding a pause point to a first group of pause points;
- determining a second frequency of the determined tone of voice in the audio narration file;
- in response to the second frequency being above a second threshold, adding a location associated with the determined tone of voice to a second group of pause points; and
- generating the set of convenient pause points based on the first group of pause points and the second group of pause points.

19. The computer program product of claim 15, wherein the inserting the determined set of convenient pause points into the audio narration file further comprises inserting the determined set of convenient pause points into the text file version of the audio narration file.

20. The computer program product of claim 15, wherein the inserting the determined set of convenient pause points into the audio narration file further comprises updating the pause point history.

* * * * *